United States Patent
Taira et al.

(10) Patent No.: US 11,241,790 B2
(45) Date of Patent: Feb. 8, 2022

(54) AUTONOMOUS MOVING BODY AND CONTROL PROGRAM FOR AUTONOMOUS MOVING BODY

(71) Applicant: TOYOTA JIDOSHA KABUSHIKI KAISHA, Toyota (JP)

(72) Inventors: Tetsuya Taira, Nagakute (JP); Daisaku Honda, Kasugai (JP); Shohei Yanagimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 16/406,578

(22) Filed: May 8, 2019

(65) Prior Publication Data
US 2019/0381661 A1 Dec. 19, 2019

(30) Foreign Application Priority Data
Jun. 15, 2018 (JP) .............................. JP2018-114573

(51) Int. Cl.
G05D 1/02 (2020.01)
B25J 9/16 (2006.01)
G05D 1/00 (2006.01)
B25J 13/08 (2006.01)

(52) U.S. Cl.
CPC ............ *B25J 9/1666* (2013.01); *B25J 9/162* (2013.01); *B25J 9/1684* (2013.01); *B25J 13/089* (2013.01); *G05D 1/0088* (2013.01)

(58) Field of Classification Search
CPC .. G05D 1/0246; G05D 1/0257; G05D 1/0291; G05D 1/0088; G08G 1/165; G08G 1/20; G08G 1/096838; G08G 1/205; B25J 19/023; B25J 19/06; B25J 19/1676; B25J 19/1666; B25J 9/1684; B25J 9/162; B25J 13/089
USPC ......... 700/245, 259, 255; 701/23; 901/1, 46; 318/568.12, 568.16
See application file for complete search history.

(56) References Cited

U.S. PATENT DOCUMENTS

| | | | |
|---|---|---|---|
| 10,037,696 B2 * | 7/2018 | Laur | G05D 1/021 |
| 10,126,747 B1 * | 11/2018 | Svec | G01C 21/20 |
| 2015/0046018 A1 | 2/2015 | Hayashi et al. | |
| 2017/0131719 A1 * | 5/2017 | Micks | G06K 9/3233 |
| 2017/0269597 A1 | 9/2017 | Maekawa | |
| 2019/0310655 A1 * | 10/2019 | Voorhies | B66F 9/063 |

FOREIGN PATENT DOCUMENTS

| | | |
|---|---|---|
| JP | 2009-248892 A | 10/2009 |
| JP | 2014-126919 A | 7/2014 |
| JP | 5880498 B2 | 3/2016 |
| JP | 2017-174379 A | 9/2017 |

* cited by examiner

*Primary Examiner* — Dalena Tran
(74) *Attorney, Agent, or Firm* — Oliff PLC

(57) ABSTRACT

Provided is an autonomous moving body configured to move along a planned movement path to execute a given task, including: an external sensor configured to recognize another autonomous moving body given another task and an operation state of the another autonomous moving body; an overtaking determination unit configured to determine, when it is recognized by the external sensor that the another autonomous moving body moves along the movement path, whether to overtake the another autonomous moving body; and a movement control unit configured to control a moving unit based on the determination of the overtaking determination unit.

14 Claims, 9 Drawing Sheets

AUTONOMOUS MOVING BODY AND CONTROL PROGRAM FOR AUTONOMOUS MOVING BODY

CROSS REFERENCE TO RELATED APPLICATIONS

This application is based upon and claims the benefit of priority from Japanese patent application No. 2018-114573, filed on Jun. 15, 2018, the disclosure of which is incorporated herein in its entirety by reference.

BACKGROUND

The present disclosure relates to an autonomous moving body and a control program for an autonomous moving body.

Techniques in which a plurality of autonomous moving robots respectively execute tasks under a specific environment have come to be known. For example, Japanese Unexamined Patent Application Publication No. 2017-174379 discloses a technique in which a plurality of cleaning robots perform cleaning while moving along paths different from each other.

SUMMARY

When a plurality of moving bodies which move autonomously under a specific environment are controlled, for example, by a centralized server under a single system, or when they can communicate with each other by communication means in conformity with a common format, each one of the plurality of moving bodies can perform a smooth autonomous movement. However, in recent years, a situation where autonomous moving bodies which are independent of each other perform separate tasks under a specific environment has also become more common. Under such a situation, it is difficult for autonomous moving bodies to cooperate with each other to adjust movement paths, and thus a smooth autonomous movement is prevented. Especially, when two autonomous moving bodies moves along one movement path in the same direction at different speeds, one autonomous moving body prevents the other autonomous moving body from moving, and thereby sometimes an operation efficiency of a task is reduced.

The present disclosure has been made to solve such a problem and provides an autonomous moving body and a control program therefor capable of properly overtaking a preceding autonomous moving body and efficiently executing a given task, without these autonomous moving bodies being controlled under a single system, or without these autonomous moving bodies communicating with each other.

A first exemplary aspect is an autonomous moving body configured to move along a planned movement path to execute a given task, including: an external sensor configured to recognize another autonomous moving body given another task and an operation state of the another autonomous moving body; an overtaking determination unit configured to determine, when it is recognized by the external sensor that the another autonomous moving body moves along the movement path, whether to overtake the another autonomous moving body; and a movement control unit configured to control a moving unit based on the determination of the overtaking determination unit.

As described above, it is determined whether to overtake the another autonomous moving body when the another autonomous moving body and an operation state thereof are recognized by the external sensor and the autonomous moving body moves along the same movement path as the another autonomous moving body does. Accordingly, it is possible to overtake the another autonomous moving body in accordance with a state thereof and efficiently execute a given task, without these autonomous moving bodies being controlled under a single system, or without these autonomous moving bodies communicating with each other.

In the above-described autonomous moving body, the overtaking determination unit may determine that the own autonomous moving body does not overtake the another autonomous moving body when it is recognized that the another autonomous moving body moves along the movement path after the another autonomous moving body has overtaken the own autonomous moving body. By determining the above, it is possible to prevent the autonomous moving bodies from overtaking each other. Further, the overtaking determination unit may determine that the own autonomous moving body does not overtake the another autonomous moving body when it is recognized that the another autonomous moving body is not an autonomous moving body of the same type as that of the own autonomous moving body. When it is not possible to determine what type of an autonomous moving body the another autonomous moving body is, it is sometimes difficult to accurately recognize the operation state based on external-appearance information acquired by the external sensor. By not performing an overtaking operation when the another autonomous moving body is not an autonomous moving body of the same type as that of the own autonomous moving body, a higher level of safety can be achieved.

Further, in the above-described autonomous moving body, the overtaking determination unit may determine, when the another task executed by the another autonomous moving body can be recognized from the operation state, whether to overtake the another autonomous moving body based on a comparison between the another task and the task given to the own autonomous moving body. For example, when it is necessary to urgently execute the task of the another autonomous moving body, a movement of the another autonomous moving body can be given a high priority. By doing the above, it is possible to perform a pseudo cooperative operation with the another autonomous moving body even when these autonomous moving bodies are not controlled under the same system.

Further, in the above-described autonomous moving body, the movement control unit can control, when the overtaking determination unit determines that the own autonomous moving body does not overtake the another autonomous moving body, the moving unit so that the own autonomous moving body follows the another autonomous moving body while the own autonomous moving body shares the movement path with the another autonomous moving body. By the own autonomous moving body following the another autonomous moving body even when the own autonomous moving body does not overtake the another autonomous moving body, it is possible to reduce an influence of the another autonomous moving body on executing the task of the own autonomous moving body. Further, in an environment where autonomous moving bodies move, it is possible to reduce a working space occupied by the two autonomous moving bodies.

Further, in the above-described autonomous moving body, the external sensor may be configured to recognize an overtaking state for the another autonomous moving body while the movement control unit controls the moving unit so that the own autonomous moving body overtakes the another autonomous moving body, and the movement control unit may be configured to determine whether to continue or abandon overtaking control based on the overtaking state to control the moving unit. Further, the movement control unit may be configured to control, when determining to abandon the overtaking control, the moving unit so that the own autonomous moving body follows the another autonomous moving body while the own autonomous moving body shares the movement path with the another autonomous moving body. For example, in the case where an obstacle is found on an overtaking path before the overtaking operation is completed, it is preferable to abandon overtaking the another autonomous moving body and achieve a movement safety. Further, in this case, by the own autonomous moving body being at the rear of the another autonomous moving body, it is possible to reliably move the own autonomous moving body to the destination.

Further, in the above-described autonomous moving body, it is preferable to include a presentation unit configured to present, when the own autonomous moving body overtakes the another autonomous moving body, to outside that the own autonomous moving body overtakes the another autonomous moving body. The another autonomous moving body recognizes an overtaking operation by a presentation of the presentation unit so that it can be expected that the another autonomous moving body performs a movement operation in accordance with the recognized overtaking operation. For example, movement operations, such as reducing a moving speed, or not performing an overtaking operation again, can be expected.

Further, the above-described autonomous moving body may further include a communication device configured to perform intercommunication with the another autonomous moving body, and the movement control unit may be configured to control, while the intercommunication is established, the moving unit based on a communication result of the intercommunication regardless of the determination of the overtaking determination unit. When the intercommunication can be performed, a cooperative operation of the autonomous moving body with the another autonomous moving body may be performed by communication using the intercommunication. It is safer for these autonomous moving bodies to communicate with each other and then determine each of the movement operations. On the other hand, even when the communication is not established, the autonomous moving body can perform a stable overtaking operation by the determination of the overtaking determination unit.

Another exemplary aspect is a control program for an autonomous moving body that moves along a planned movement path to execute a given task, the control program being adapted to cause a computer to perform: a recognition step of recognizing another autonomous moving body given another task and an operation state of the another autonomous moving body by using an external sensor; an overtaking determination step of determining, when it is recognized by the recognition step that the another autonomous moving body moves along the movement path, whether to overtake the another autonomous moving body; and a movement control step of controlling a moving unit based on the determination of the overtaking determination step.

As described above, it is determined whether to overtake the another autonomous moving body when the another autonomous moving body and an operation state thereof are recognized by the external sensor and the autonomous moving body moves along the same movement path as the another autonomous moving body does. Accordingly, it is possible to overtake the another autonomous moving body in accordance with a state thereof and efficiently execute a given task, without these autonomous moving bodies being controlled under a single system, or without these autonomous moving bodies communicating with each other.

According to the present disclosure, it is possible to provide an autonomous moving body and a control program therefor capable of properly overtaking a preceding autonomous moving body and efficiently executing a given task, without these autonomous moving bodies being controlled under a single system, or without these autonomous moving bodies communicating with each other.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
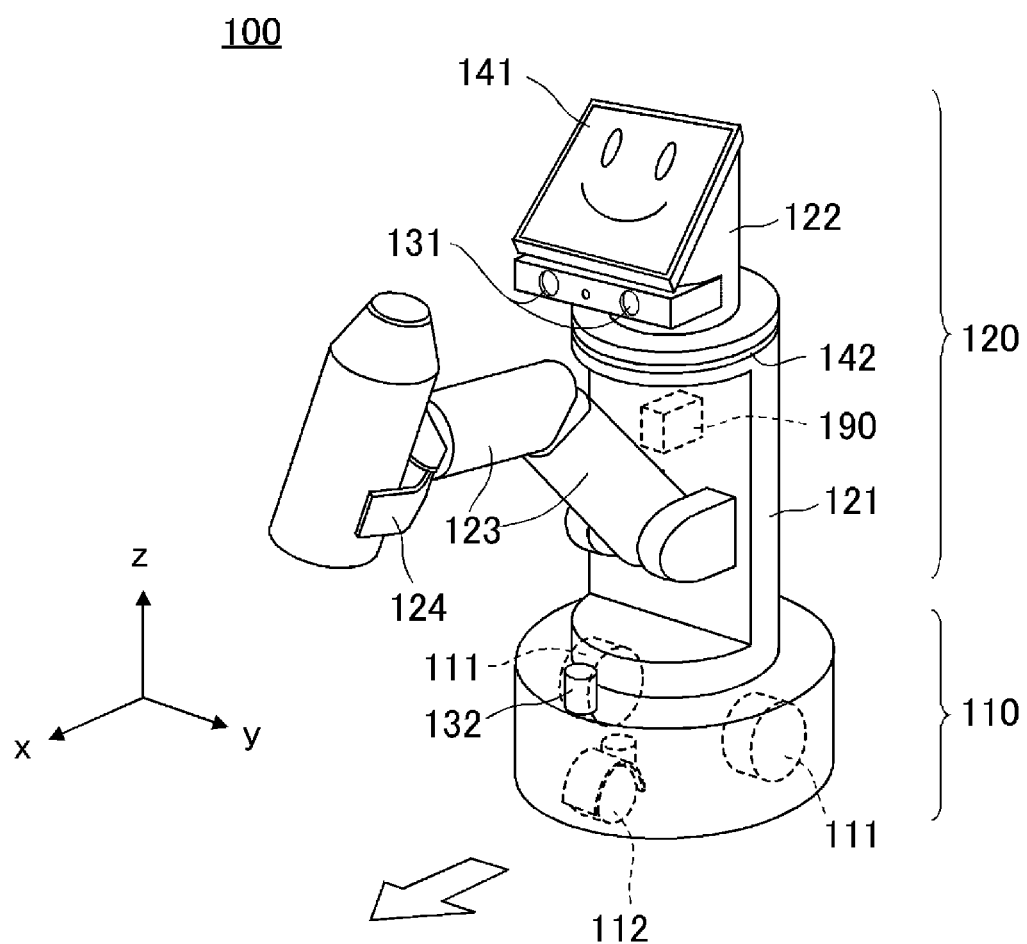
FIG. 1 is an external perspective view of a moving robot according to an embodiment.

FIG. 1 is an external perspective view of a moving robot 100 according to this embodiment. The moving robot 100 is an example of an autonomous moving body. The moving robot 100 is mainly composed of a carriage unit 110 and a main unit 120.

The carriage unit 110 supports two drive wheels 111 and one caster 112, each of which is grounded on a travel surface, in a cylindrical case. The two drive wheels 111 are disposed so that the centers of their rotation axes coincide with each other. Each drive wheel 111 is independently and rotationally driven by using a motor (not shown). The drive wheel 111 is an example of a moving unit for moving the moving robot. The caster 112 is a driven wheel and provided so that a rotating shaft extending in a vertical direction from the carriage unit 110 pivotally supports the wheel apart from the rotation axis of the wheel. Further, the caster 112 follows the carriage unit 110 in accordance with a moving direction thereof.

For example, the moving robot 100 goes straight when the two drive wheels 111 are rotated at the same speed in the same direction, and rotates around the vertical axis passing through the center of two drive wheels 111 of the carriage unit 110 when the two drive wheels 111 are rotated at the same speed in the reverse direction. That is, the moving robot 100 can move parallel to and rotate in a predetermined direction by controlling a turning direction and a turning speed of each of the two drive wheels 111.

The carriage unit 110 includes a laser scanner 132 on a peripheral part of the upper surface thereof. The laser scanner 132 scans a certain range in a horizontal surface for each step angle, and outputs whether or not there is an obstacle in each of the directions. Further, when there is an obstacle, the laser scanner 132 outputs a distance to the obstacle.

The main unit 120 mainly includes a body part 121 mounted on an upper surface of the carriage unit 110, a head part 122 placed on an upper surface of the body part 121, an arm 123 supported on a side surface of the body part 121, a hand 124 provided at a distal end of the arm 123, and an LED bar 142. The arm 123 and the hand 124 are driven by a motor (not shown), and grasp various objects in a controlled posture. FIG. 1 shows a state where the moving robot 100 grasps a container as an example of an object to be conveyed. The body part 121 can rotate around the vertical axis with respect to the carriage unit 110 by a driving force of the motor (not shown). Accordingly, the moving robot 100 can also move in a predetermined direction while maintaining a posture in which the grasping unit grasps an object to be conveyed and faces a specific direction.

The LED bar 142 is a light emitting device including a plurality of LEDs and light guide materials, and the LEDs are disposed on an annular outer peripheral part of the upper part of the body part 121 so that each of the LEDs emits light in the radial directions with respect to the vertical axis. The LED bar 142 can change a light emitting color and a blinking cycle, and this changing pattern makes it possible to present information on an operation state and a task of the moving robot 100 to the surroundings. Further, a control unit 190 is provided in the body part 121. The control unit 190 includes a control unit, a memory and the like, which will be described later.

The head part 122 mainly includes a stereo camera 131 and a display panel 141. The stereo camera 131 has a configuration in which two camera units having the same angle of view are disposed apart from each other, and it outputs images photographed by each of the camera units as image data.

The display panel 141 is, for example, a liquid-crystal panel, and displays a face of a character by illustration, or presents information on the moving robot 100 by using texts and icons. When the display panel 141 displays a face of a character, the impression that the display panel 141 is a dummy face can be given to surrounding observers. Further, the display panel 141 includes a touch panel on the display surface and can receive an input instruction from a user.

The head part 122 can rotate around the vertical axis with respect to the body part 121 by a driving force of the motor (not shown). Accordingly, the stereo camera 131 can photograph a target object present in a predetermined direction, and the display panel 141 can present a display content toward a predetermined direction. Note that in the following description, as shown in the drawings, a moving plane where the moving robot 100 moves is defined as an xy plane, and a vertical axis direction with respect to the moving plane is defined as a z-axis.

Figure 2:
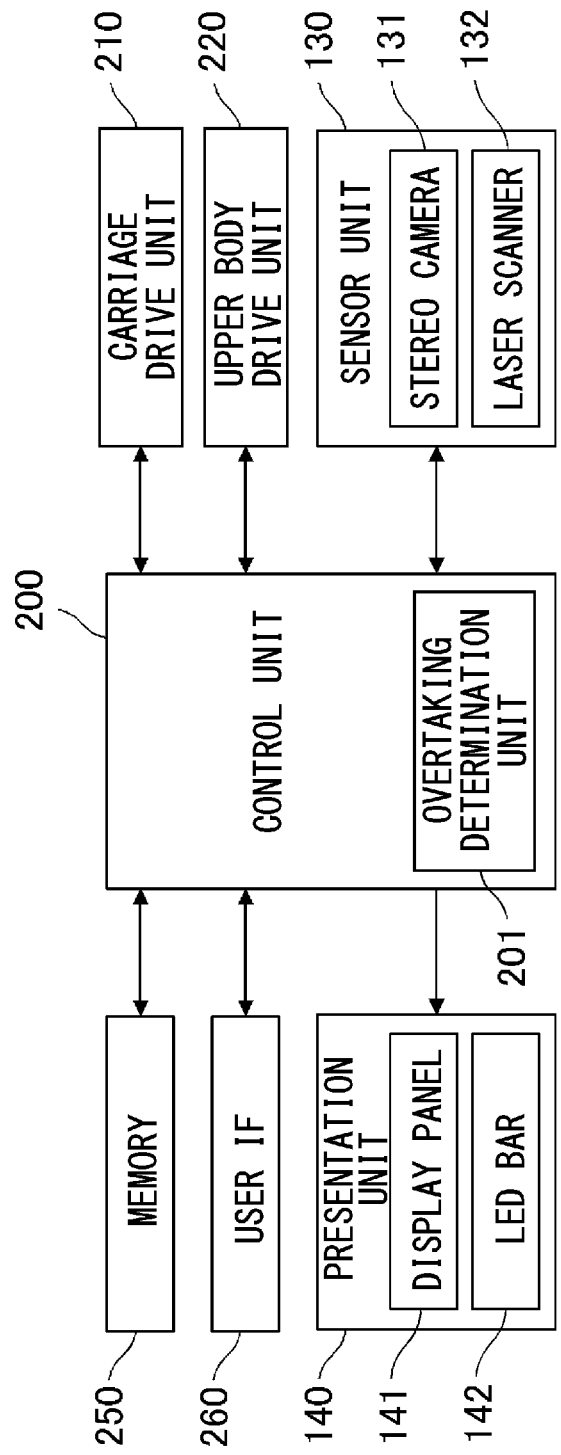
FIG. 2 is a control block diagram of the moving robot.

FIG. 2 is a control block diagram of the moving robot 100. A control unit 200, for example, is a CPU, and is housed in the control unit 190 of the main unit 120. A carriage drive unit 210 includes a drive circuit and a motor for driving the drive wheels 111. The control unit 200 sends a drive signal to the carriage drive unit 210 to control a rotation of the drive wheels 111. Further, the control unit 200 receives a feedback signal of an encoder or the like from the carriage drive unit 210, and recognizes a moving direction of the carriage. The carriage drive unit 210 functions as a movement control unit by cooperating with the control unit 200.

An upper body drive unit 220 includes a drive circuit and a motor for driving a grasping unit including an arm 123 and a hand 124, the body part 121, and the head part 122. The control unit 200 sends a drive signal to the upper body drive unit 220 to control grasping, and a rotation of the body part 121 and the head part 122. Further, the control unit 200 receives a feedback signal of an encoder or the like from the upper body drive unit 220, and recognizes a state of the grasping unit and directions of the body part 121 and the head part 122.

A sensor unit 130 includes various sensors for detecting, for example, another moving robot, an obstacle, a person present in the surrounding area, and a grasped object to be conveyed, and is disposed in the carriage unit 110 and the main unit 120 in a distributed manner. The stereo camera 131 and the laser scanner 132 are components constituting the sensor unit 130. The control unit 200 sends a control signal to the sensor unit 130 to drive various sensors, and then obtains output signals and output data from them. The control unit 200 analyzes these output signals and output data to recognize another moving robot 100, the operation state thereof, and the like. That is, the sensor unit 130 functions as an external sensor for recognizing another autonomous moving body, the operation state thereof, and the like by cooperating with the control unit 200.

A memory 250 is a nonvolatile storage medium, and for example, a solid state drive is used. The memory 250 stores various parameter values, functions, lookup tables, comparative image data and the like which are used for controlling the moving robot 100 in addition to a control program. The memory 250 may store an environmental map representing an environment in which the moving robot 100 moves autonomously.

A user IF 260 is an input unit for a user to input an instruction to the moving robot 100, and a touch panel superimposed in the display panel 141 is a part of the user IF 260. Further, as well as a physical switch, a voice input using a microphone, a gesture input using the stereo camera 131, and the like may be incorporated as the user IF 260.

A presentation unit 140 directly or indirectly presents information on the operation state and the task of the moving robot 100 to the surroundings such as a user, a person present in the surrounding area, and another moving robot, and is disposed in the carriage unit 110 and the main unit 120 in a distributed manner. The display panel 141 and the LED bar 142 are components constituting the presentation unit 140. The presentation unit 140 may also include a speaker, an oscillator, and the like. The control unit 200 operates each of the components by sending a control signal to the presentation unit 140.

The control unit 200 functions as a function calculation unit for performing various calculations related to controls. The overtaking determination unit 201 determines, when it is recognized by the external sensor that preceding another autonomous moving body moves on the movement path where the moving robot 100 intends to move, whether to overtake the another autonomous moving body. A specific determination method will be described in detail later.

In recent years, there has been a growing demand that a plurality of moving robots be autonomously moved to simultaneously execute various tasks in parallel. For example, in a case where a plurality of moving robots are made to respectively execute tasks different from each other under a controlled environment such as a factory, a system can be constructed, by installing a server for comprehensively managing these moving robots, so that the server controls a movement of each of the moving robots and an execution of the tasks. Even when a comprehensive management is not performed by a server, in a managed environment where people who stay with moving robots are restricted, it is possible to use only moving robots that can communicate with each other by using communication means in conformity with a common format. In this case, the moving robots communicate with each other by using communication means so that they can adjust a movement path and a task execution with each other.

However, the demand for an environment in which a plurality of moving robots execute tasks different from each other has become stronger with each passing year. Examples of places where a plurality of moving robots execute tasks different from each other include an airport, a shopping mall, and a theme park. In such an environment where many people gather, various tasks are given to moving robots, and thus it has become difficult to cover all the tasks only with moving robots controlled under a single system. Further, in addition to the above difficulty, for example, there is little rationality in managing a moving robot that conveys loads and a moving robot that performs cleaning, under a single system. Therefore, a moving robot that smoothly performs a given task without interfering with other moving robots has come to be desired even if such a robot does not belong to a group of moving robots categorized by a single system or common communication means. The moving robot 100 according to this embodiment responds to such a demand.

As described above, the moving robot 100 includes no communication device for communicating with other moving robots. Further, it also includes no communication device for receiving an instruction from a server which comprehensively manages a plurality of moving robots. In the above-described moving robot 100, in order to smoothly and steadily perform a given task, one of the important points is what operation is performed when another autonomous moving body is preceding on the movement path where the own moving robot intends to move. The operation of the moving robot 100 in such a case is described using a specific example.

Figure 3:
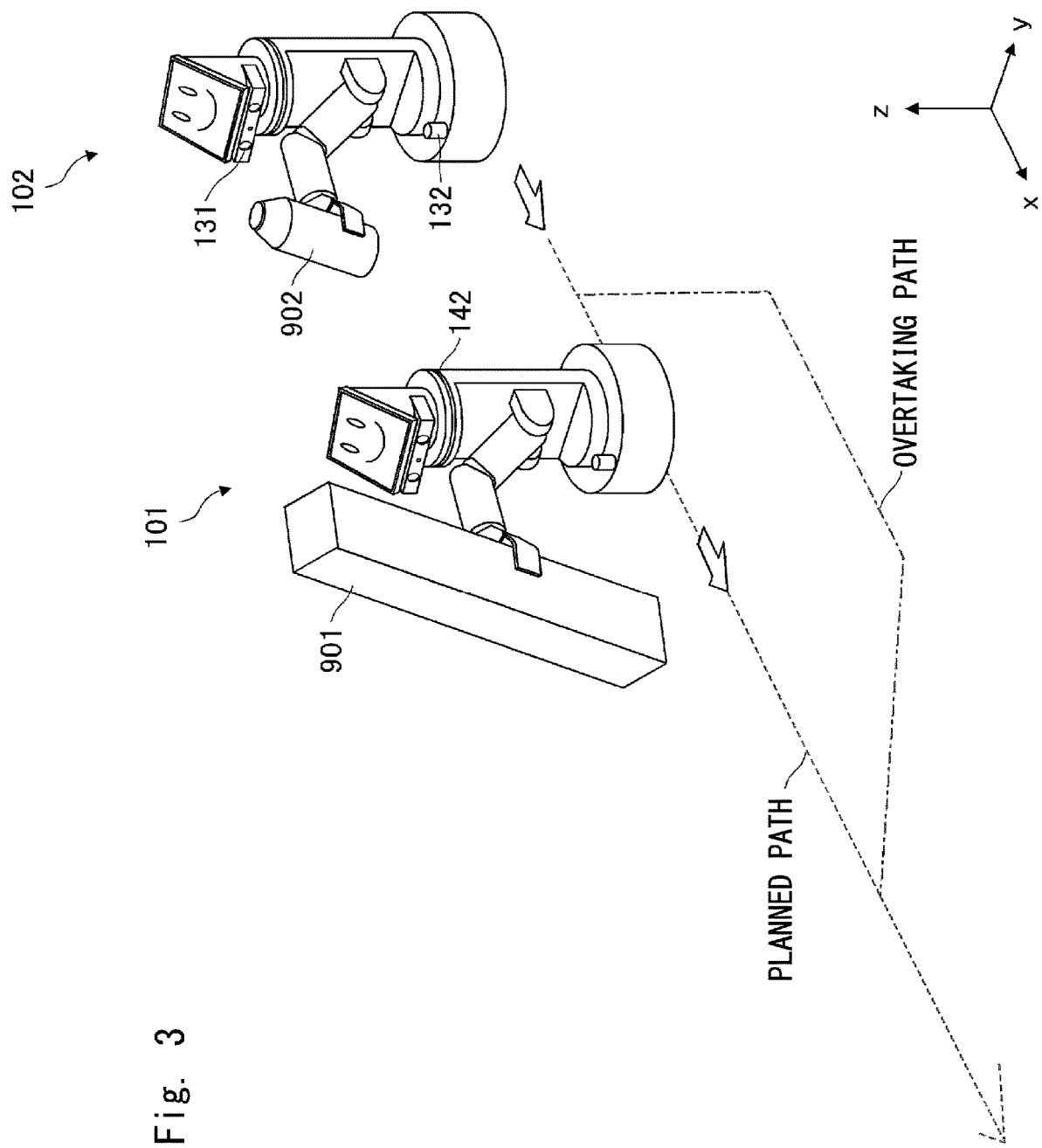
FIG. 3 is a diagram for explaining a state of an overtaking determination in an example.

FIG. 3 is a diagram for explaining a state of an overtaking determination in an example. Note that a moving robot 101 is another moving robot given a task of conveying a conveying object 901 and has the same configuration as that of the above-described moving robot 100. Further, a moving robot 102 is the own moving robot given a task of conveying a conveying object 902 and has also the same configuration as that of the above-described moving robot 100. The moving robots 101 and 102 independently perform each of the tasks thereof, and they do not communicate with each other by using communication means.

The moving robot 101, which is another moving robot, is moving in the x-axis direction. The moving robot 102, which is the own moving robot, is also moving on the same line as that which the another moving robot 101 is moving on and is approaching the preceding moving robot 101 from behind thereof. That is, a movement path planned by the moving robot 101 and a movement path planned by the moving robot 102 accidentally overlap each other, and further the moving robot 101 moving at a low speed is moving ahead of the moving robot 102 moving at a high speed.

The moving robot 102, which is the own moving robot, autonomously moves while observing an outside situation by using the stereo camera 131 and the laser scanner 132. When the control unit 200 recognizes, during the own moving robot moves autonomously, the moving robot 101 moving autonomously in the forward direction by performing an image analysis of an image captured by the stereo camera 131, the control unit 200 subsequently checks an operation state of the moving robot 101. The operation states to be checked are set as a plurality of items in advance, and the control unit 200 checks the operation state of the moving robot 101 by using an output of the sensor unit 130. The control unit 200 firstly checks a moving direction and a speed of the moving robot 101 as one of the operation states to be checked.

By continuously acquiring image data from the stereo camera 131, the control unit 200 calculates the moving direction and the speed of the moving robot 101 from the difference among the acquired image data. Alternatively, by continuously acquiring outputs of the laser scanner 132, the control unit 200 may calculate the moving direction and the speed of the moving robot 101. The control unit 200 may select which sensor is used to calculate the moving direction and the speed of the moving robot 101 in accordance with the recognized shape, color, and the like of the moving robot 101.

The overtaking determination unit 201 determines, when the control unit 200 recognizes that preceding moving robot 101 is moving in the same direction as that of the own moving robot (the moving robot 102) at a speed lower than that of the own moving robot on the movement path where the own moving robot plans to move, whether to overtake the moving robot 101. Note that the meaning of "moving in the same direction" includes a case where a movement of the own moving robot is restricted over a certain period of time in order to avoid it contacting with the moving robot 101 at least when it is assumed that the own moving robot moves along the planned path without any change, and it is not necessary for the planned paths of these moving robots to strictly coincide with each other.

The overtaking determination unit 201 determines whether to perform overtaking based on the checked operation state of the moving robot 101. For example, when the overtaking determination unit 201 recognizes that the LED bar 142 of the moving robot 101 emits light with a light-emitting pattern allowing overtaking, it checks other operation states on the assumption of overtaking. Further, when the overtaking determination unit 201 recognizes that the conveying object 901 to be conveyed by the moving robot 101 laterally protrudes greatly with respect to the moving direction, it abandons overtaking.

When the overtaking determination unit 201 has determined that it is possible to perform overtaking by checking the operation state of the moving robot 101, and subsequently determines whether or not it is possible to generate an overtaking path. The overtaking path is a path for avoiding a movement of the moving robot 101 and making a detour to the side thereof. When it is not possible to generate an overtaking path since there is a nearby obstacle such as a wall, the overtaking determination unit 201 abandons overtaking. When the overtaking is abandoned, the control unit 200 controls the carriage drive unit 210 so that the own moving robot reduces the speed thereof and follows the moving robot 101 along the original movement path.

Figure 4:
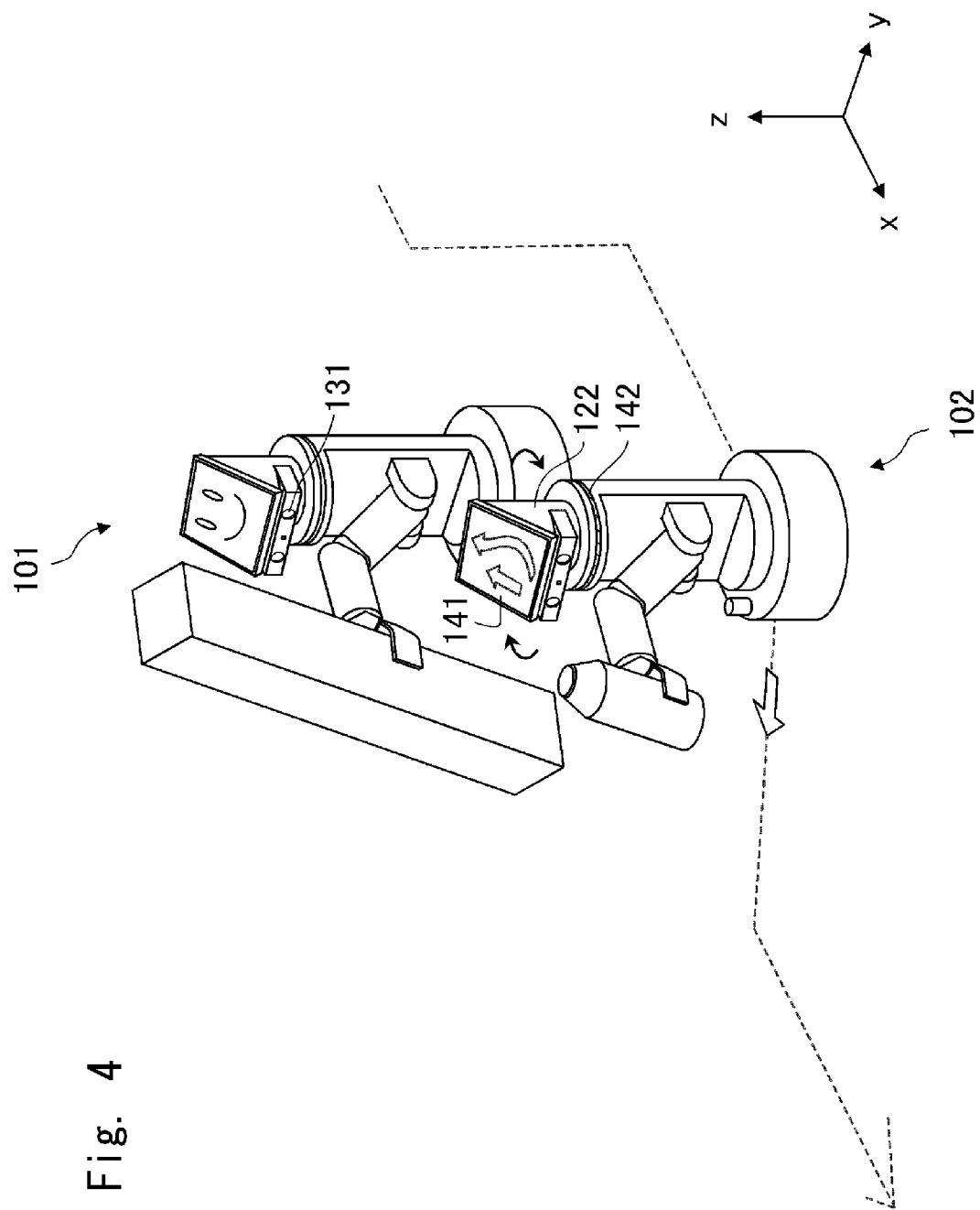
FIG. 4 is a diagram for explaining a state during an overtaking operation.

When the overtaking determination unit 201 has determined that it is possible to perform overtaking based on the operation state of the moving robot 101 and has determined to perform an overtaking operation by successfully generating an overtaking path, the control unit 200 controls the carriage drive unit 210 so that the own moving robot moves along the overtaking path. FIG. 4 is a diagram for explaining a state during the overtaking operation.

During the overtaking operation, the control unit 200 controls the display panel 141 display an icon and letters indicating to the surrounding that the overtaking operation is in progress. At this time, the control unit 200 may send a control signal to the upper body drive unit 220 to rotate the head part 122 so that surrounding people and moving robots can recognize it easily. Further, the control unit 200 controls the LED bar 142 emit light with a light-emitting pattern indicating that the overtaking operation is in progress.

By such a presentation by the moving robot 102, the moving robot 101 to be overtaken can recognize that it is overtaken as long as it is a moving robot of the same type as that of the moving robot 102 even when neither of them includes communication devices for communication. That is, it is possible to recognize the overtaking operation of the moving robot 102 by capturing a display on the display panel 141 and the light-emitting pattern of the LED bar 142 of the moving robot 102 using the stereo camera 131. The moving robot 101 may perform movement control such as reducing a speed, when recognizing to be overtaken.

Figure 5:
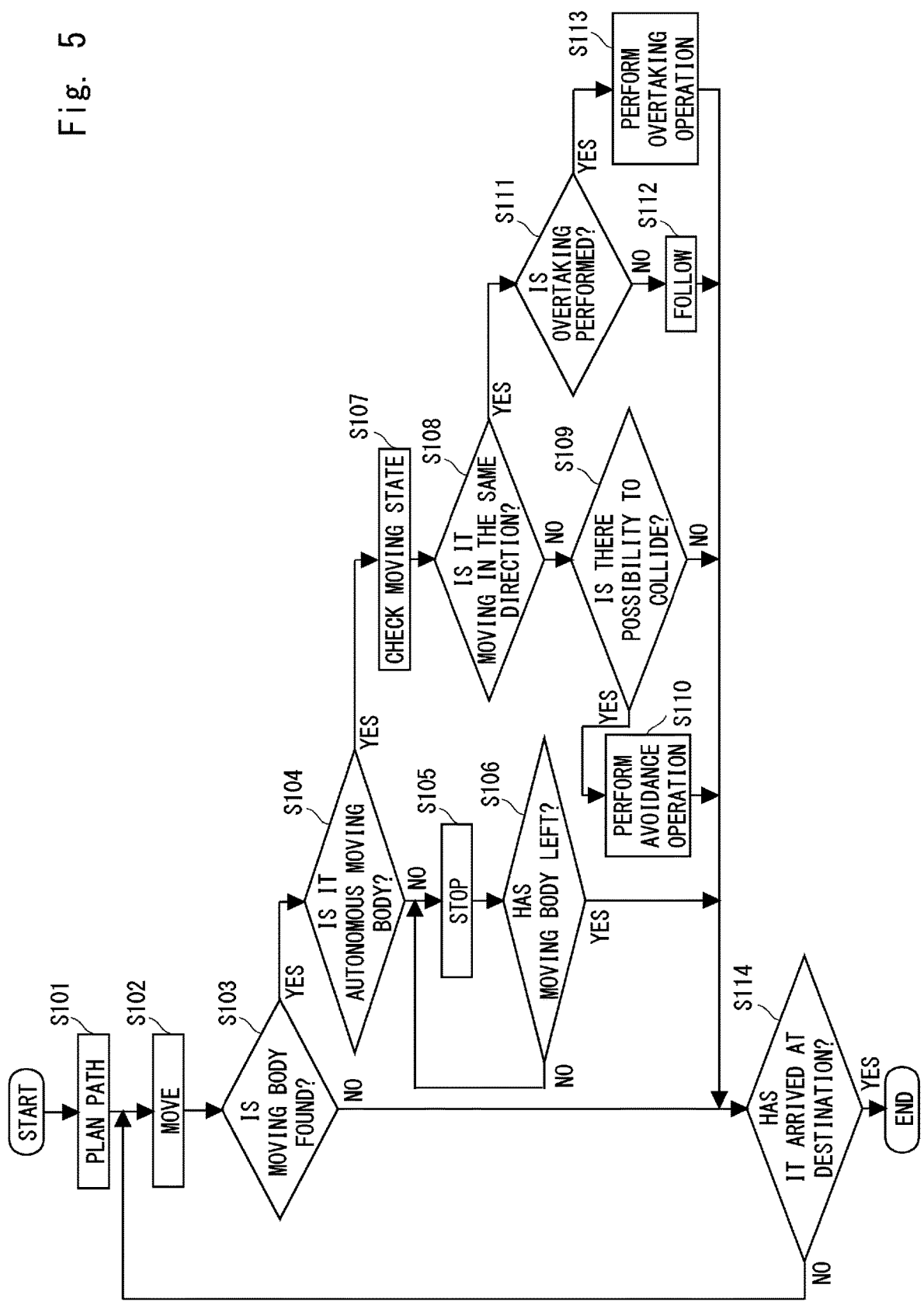
FIG. 5 is a flowchart showing a process flow regarding movement of the moving robot.

Next, a process flow regarding movement of the moving robot 100 is described. FIG. 5 is a flowchart showing the process flow regarding the movement of the moving robot 100. The flow starts when a task is given and ends with the arrival of the moving robot 100 at the destination.

In Step S101, the control unit 200 plans a movement path for movement required to execute a task. Planning for the movement path is performed with reference to, for example, an environmental map stored in the memory 250. For example, since a user designates a conveyance destination when it is a task of conveying a conveying object, the control unit 200 plans the movement path from the current location to the conveyance destination with reference to the environmental map. The current location is recognized by, for example, an output from a GPS unit mounted as the sensor unit 130.

In Step S102, the control unit 200 controls the carriage drive unit 210 so that the own moving robot moves along the planned movement path. The control unit 200 continuously acquires an output signal and output data from the sensor unit 130 during the movement of the own moving robot to monitor whether or not there is an obstacle or a moving body is approaching. When an obstacle is found, the control unit 200 generates an avoidance path to avoid the obstacle. The control unit 200 checks whether or not a moving body is approaching in Step S103, and if no moving body is approaching, the process proceeds to Step S114. If a moving body is approaching, the process proceeds to Step S104.

In Step S104, the control unit 200 determines whether or not the found moving body is an autonomous moving body. If the control unit 200 determines that the found moving body is not an autonomous moving body, it stops the movement of the own moving robot in Step S105 in order to give a priority to a movement of the found target including the case where the target is a person. Then, the own moving robot waits while maintaining itself at a standstill until it is possible to determine in Step S106 that the target moving body has left. When it is possible to determine that the moving body has left, the process proceeds to Step S114.

When the control unit 200 determines that the found moving body is an autonomous moving body in Step S104, the process proceeds to Step S107 and then the control unit 200 checks an operation state of the determined autonomous moving body. In Step S108, the control unit 200 determines whether or not the autonomous moving body is moving in the same direction as that of the own moving body based on a result of checking the operation state of the autonomous moving body. When it determines that the autonomous moving body is not moving in the same direction as that of the own moving body, the process proceeds to Step S109. In Step S109, the control unit 200 calculates a possibility that the own moving robot may collide with the autonomous moving body. As a result, when there is a possibility of a collision, the process proceeds to Step S110 and the control unit 200 performs an avoidance operation. The avoidance operation includes an operation of the own moving body stopping in accordance with the operation of the autonomous moving body. When the avoidance operation is completed in Step S110, or when it is determined that there is no possibility of a collision in Step S109, the process proceeds to Step S114.

When the control unit 200 determines that the autonomous moving body is moving in the same direction as that of the own moving robot in Step S108, the process proceeds to Step S111. In Step S111, the overtaking determination unit 201 determines whether to overtake the autonomous moving body as described with reference to FIG. 3. When the overtaking determination unit 201 determines to not perform an overtaking operation, the process proceeds to Step S112 and a following of the autonomous moving robot by the own moving robot is performed. Then, the process proceeds Step S114. When it determines to perform the overtaking operation, the process proceeds to Step S113 and the overtaking operation is performed as described with reference to FIG. 4. Then, the process proceeds to Step S114.

In Step S114, the control unit 200 checks whether or not the own moving robot arrives at the destination. When the own moving robot has not yet arrived at the destination, the process returns to Step S102 and the movement control is continued. When it has arrived at the destination, the series of the movement controls are ended.

Note that it is possible to perform the determination in Step S111 while consideration is given to various conditions. For example, when the overtaking determination unit 201 recognizes that the autonomous moving body is moving ahead of the own moving robot in the same movement path as that in which the own moving robot is in after overtaking the own moving robot, the overtaking determination unit 201 determines that the own moving robot does not overtake the autonomous moving body. If the overtaking operation is performed, it is further assumed that the autonomous moving body intends to overtake the own moving robot. Accordingly, by not performing an overtaking operation for a moving body which has been overtaken once, overtaking of these autonomous moving bodies by each other is prevented. Some examples of states of avoiding the overtaking operation are further described.

Figure 6:
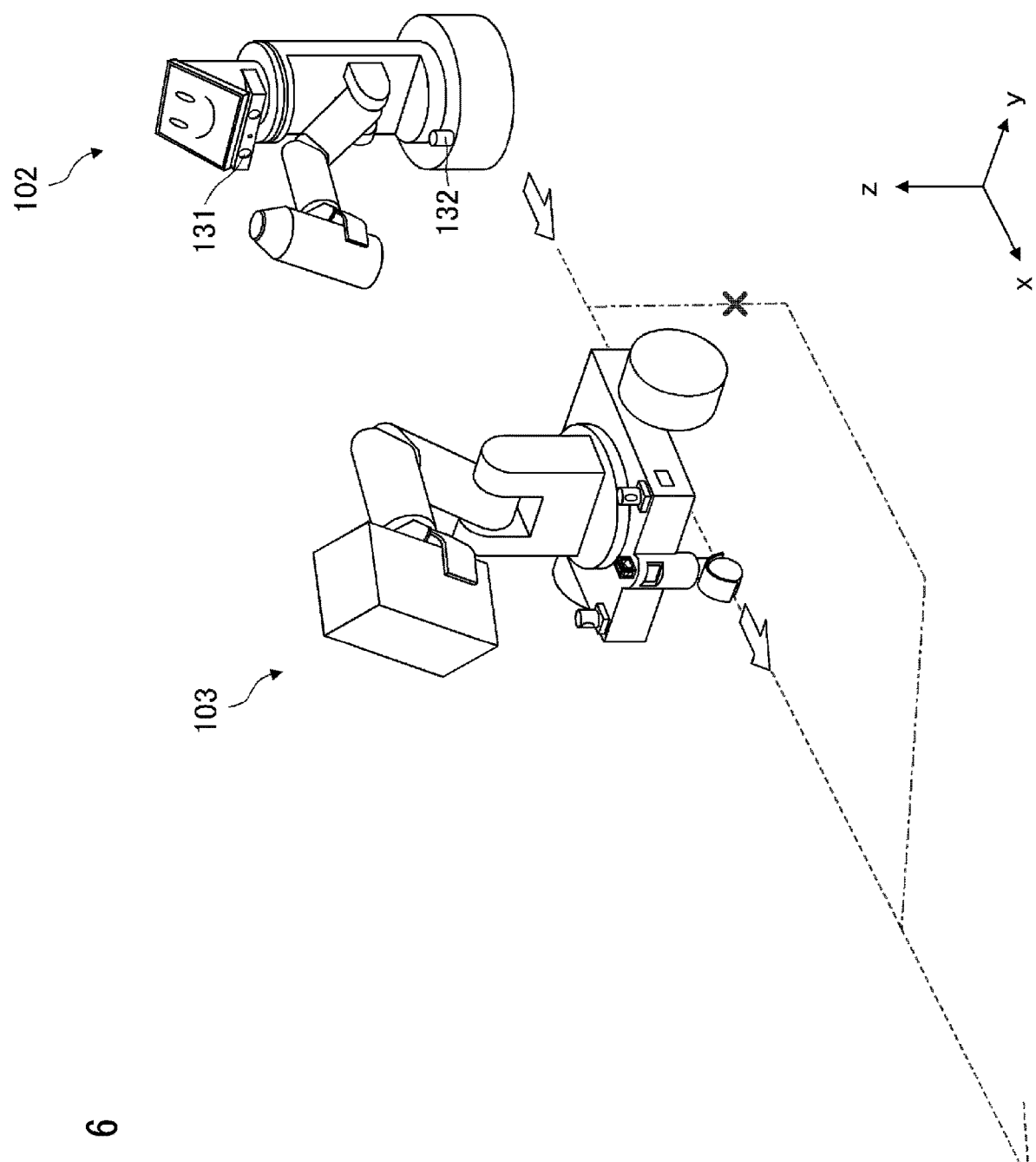
FIG. 6 is a diagram for explaining a state of an overtaking determination in another example.

FIG. 6 is a diagram for explaining a state of the overtaking determination in another example. The state in FIG. 6 is different from that in FIG. 3 in that another preceding moving robot 103 is an autonomous moving body of a type different from that of the moving robot 102 which is the own moving robot. The moving robot 103 has a property different from that of the moving robot 102, and a task in accordance with the property is given to the moving robot 103. Obviously, a user who gives a task to the moving robot 103 can be different from the user of the moving robot 102.

Under such a situation, the control unit 200 recognizes in Step S104 that the moving robot 103 is not an autonomous moving body of the same type as that of the own moving robot. Then, when the process has proceeded to Step S111, the overtaking determination unit 201 determines that the own moving robot does not overtake the moving robot 103. When the target is an autonomous moving body of a type different from the own moving robot, it is sometimes difficult to accurately recognize the operation state based on external-appearance information acquired by the sensor unit 130. Therefore, by not performing an overtaking operation, a high level of safety can be achieved. However, even when it is an autonomous moving body of a type different from the own moving robot, in the case where the operation state can accurately be recognized based on the external-appearance information, the overtaking determination unit 201 may determine to overtake the autonomous moving body of the type different from the own moving robot.

Figure 7:
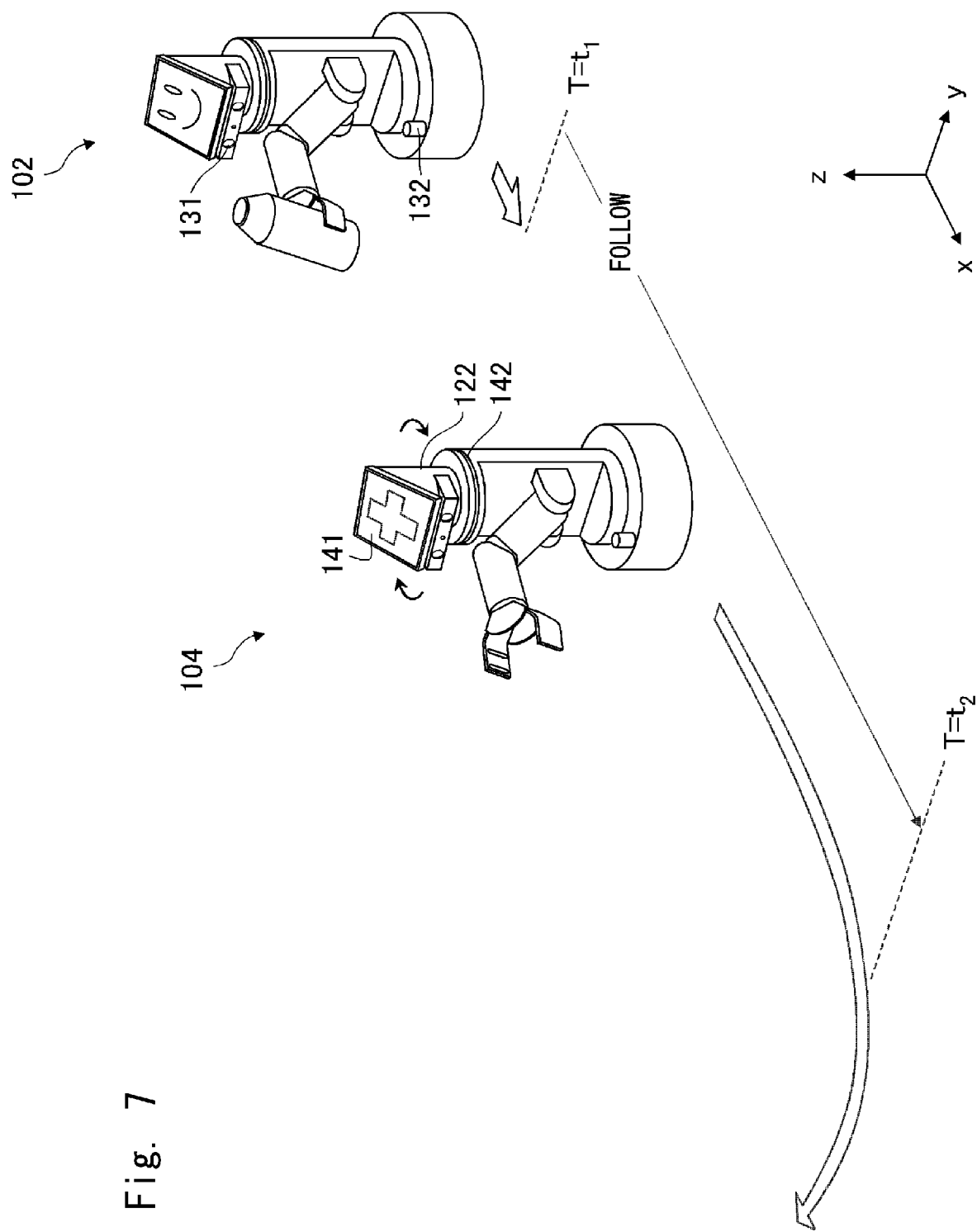
FIG. 7 is a diagram for explaining a state of an overtaking determination in another example.

FIG. 7 is a diagram for explaining a state of the overtaking determination in another example. The state in FIG. 7 is different from that in FIG. 3 in that another preceding moving robot 104 is executing a task having a higher emergency than the one that the moving robot 102, which is the own moving robot, is executing.

At a stage where the moving robot 102 checks the operation state of the preceding moving robot 104, the control unit 200 of the moving robot 102 can sometimes recognize information on the task executed by the moving robot 104. As shown in FIG. 7, the moving robot 104 displays an icon indicating a medical emergency on the display panel 141 and emits light with a pattern light indicating a medical emergency by using the LED bar 142 when a given task is a task of a medical emergency, such as bringing life-saving appliances from a predetermined shelf. Further, the moving robot 104 rotates the head part 122.

The control unit 200 of the moving robot 102 which is the own moving robot recognizes the above-described display and emitted light, and thereby recognizing that the moving robot 104 is executing an emergency task. Then, the overtaking determination unit 201 recognizes that the emergency task has a priority higher than that of a normal conveyance of a conveying object, which is a task of the own moving robot, and determines to perform no overtaking operation. A priority of the task is stored in advance, for example, in the memory 250 as a lookup table, and the overtaking determination unit 201 checks the level of the priority referring to this table.

When the overtaking determination unit 201 determines to not perform an overtaking operation, the control unit 200 of the moving robot 102 controls the carriage drive unit 210 so that the moving robot 102 follows the moving robot 104 while the moving robot 102 shares the movement path with the moving robot 104. For example, as shown in FIG. 7, when it is determined to not perform an overtaking operation and a following of the moving robot 104 by the own moving robot is started at a time $T=t_1$, the following of the moving robot 104 by the own moving robot is continued until it is determined that the moving robot 104 has swerved off the planned path at a time $T=t_2$.

Note that when the task of the own moving robot has a priority higher than that of the moving robot 104, the overtaking operation is performed as long as other operation states allow. By performing the above determination and movement control, even when no moving robots are controlled under the same system, or even when no moving robots include communication devices for communicating with each other, it is possible for these moving robots to perform a pseudo cooperative operation.

Figure 8:
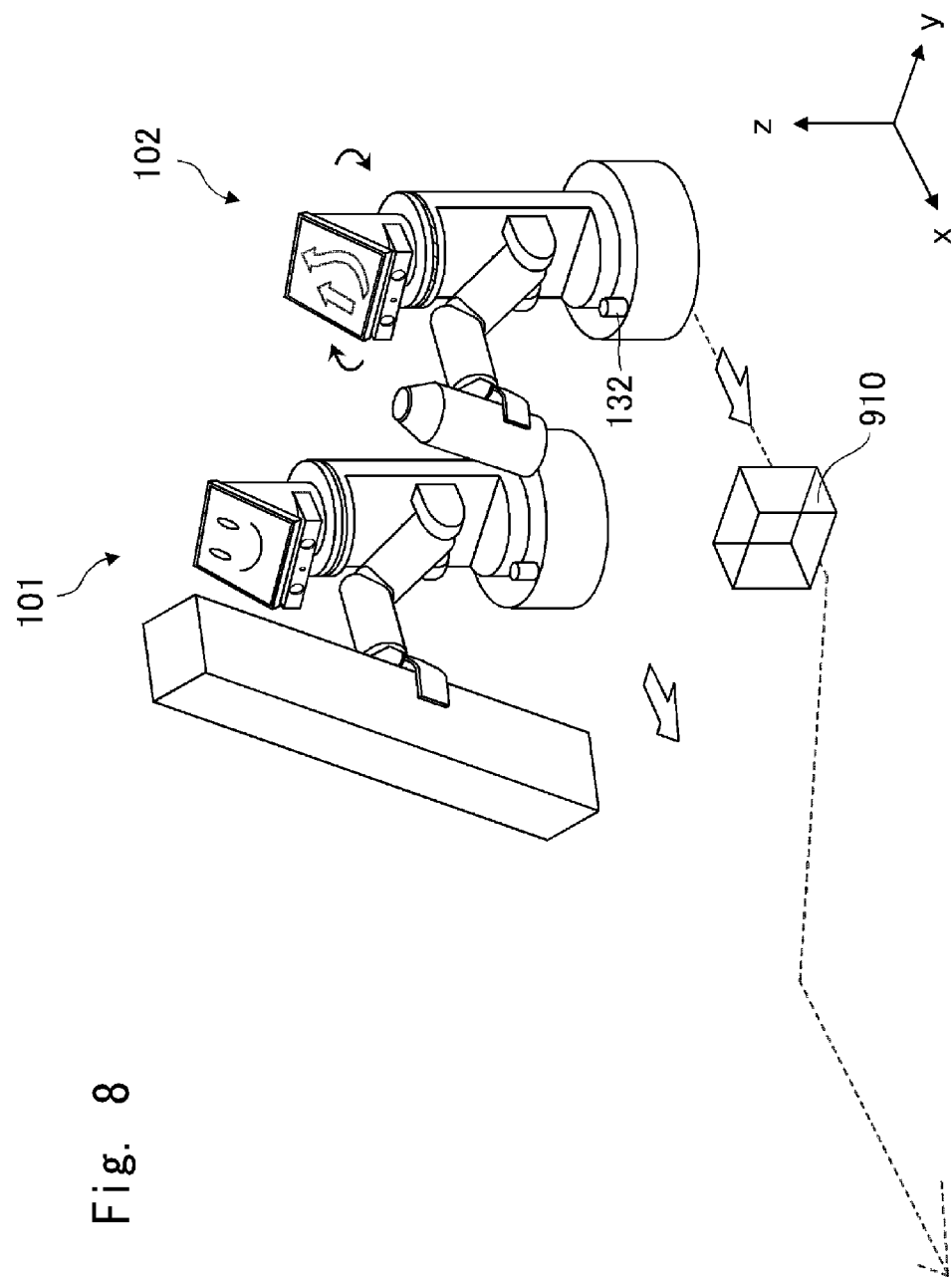
FIG. 8 is a diagram for explaining a state during an overtaking operation in another example.
Figure 9:
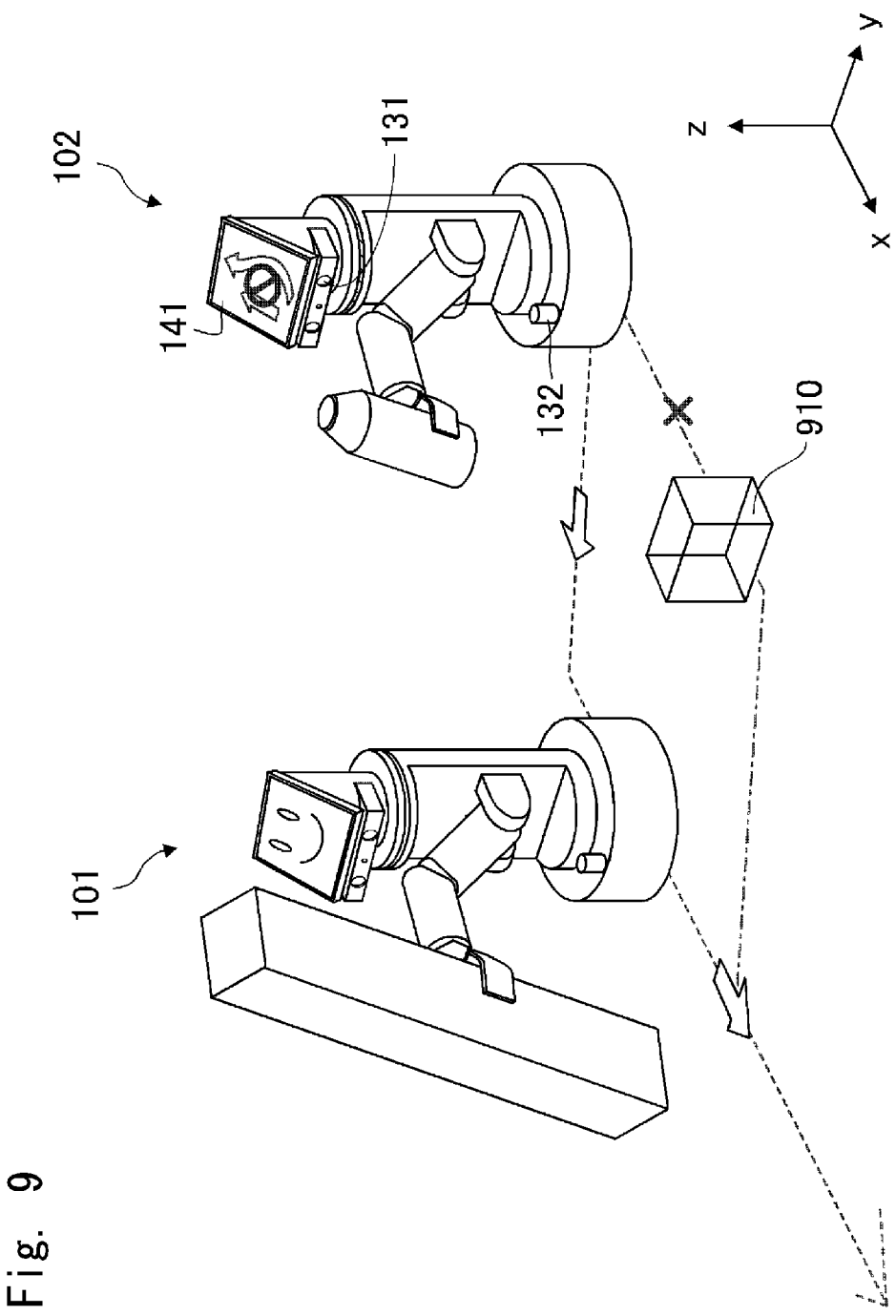
FIG. 9 is a diagram for explaining a state where an overtaking operation is abandoned.

Next, exception processing of the overtaking operation is described. FIG. 8 is a diagram for explaining a state during the overtaking operation in another example, and FIG. 9 is a diagram for explaining a state where the overtaking operation is abandoned.

Although FIG. 8 shows a state where the moving robot 102, which is the own moving robot, overtakes the preceding moving robot 101 in the same manner as that in FIG. 4, it is different from FIG. 4 in that it shows a state where there is an obstacle 910 on the overtaking path.

The control unit 200 continuously acquires output signals and output data from the sensor unit 130 even during the overtaking, and recognizes an overtaking state and a surrounding environment for the moving robot 101. Then, before a completion of the overtaking operation, the control unit 200 abandons the overtaking control, for example, when the laser scanner 132 detects the obstacle 910 on the overtaking path. When the control unit 200 abandons the overtaking control, it checks a movement state of the moving robot 101 by the stereo camera 131 or the laser scanner 132 and controls the carriage drive unit 210 so that the own moving robot follows the moving robot 101, as shown in FIG. 9. Then, while the own moving robot shares the movement path with the moving robot 101, it follows the moving robot 101. When the obstacle 910 is found on the overtaking path, it is preferable to abandon overtaking and achieve a movement safety. Further, in this case, by being at the rear of the moving robot 101, it is possible to reliably move the own moving robot to the destination.

Note that when the control unit 200 abandons the overtaking operation, it may display an icon indicating the abandonment on the display panel 141. When the moving robot 101 recognizes the abandonment of the overtaking operation by the moving robot 102, the moving robot 101 may perform control such as resetting a moving speed which has been reduced for the overtaking. Further, the control unit 200 abandons the overtaking operation not only when the obstacle is found on the overtaking path, but also when recognizing any state preventing the overtaking operation. For example, in the case where the moving robot 102 cannot overtake the preceding moving robot 101 even when the moving robot 102 travels the planned overtaking path, the control unit 200 abandons the overtaking operation.

Although this embodiment has been described above by using the moving robot 100 including no communication device, moving robots which can perform this embodiment are not limited to those including no communication device. For example, a plurality of moving robots belonging to one group of moving robots may respectively adjust movements thereof by communication using a communication device, and may perform the above-described control when recognizing other moving robots which do not belong to any group of moving robots. Alternatively, while intercommunication with other moving robots is established, the movement control may be performed based on a communication result of the intercommunication regardless of the determination of the overtaking determination unit 201, and when the intercommunication is not established, the movement control may be performed based on the determination of the overtaking determination unit 201. When communication with other moving robots is performed through a communication device, a server may be used. In this case, the server may control the communication independently.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous moving body configured to move along a planned movement path to execute a given task, comprising:
   an external sensor configured to detect another autonomous moving body given another task and an operation state of the other autonomous moving body; and
   a processor programed to perform a first determination of whether to overtake the other autonomous moving body based on the external sensor detecting that the other autonomous moving body is moving along the planned movement path, and
   perform a second determination of whether an overtaking path can be generated; and
   a drive circuit configured to
      in response to (i) the first determination indicating that overtaking the other autonomous moving body is to be performed and (ii) the second determination indicating that the overtaking path can be generated, control the autonomous moving body to perform an overtaking operation, and
      in response to (i) the first determination indicating that overtaking the other autonomous moving body is to be performed and (ii) the second determination indicating that the overtaking path cannot be generated, abandon the overtaking operation.

2. The autonomous moving body according to claim 1, wherein the first determination indicates that overtaking the other autonomous moving body is not to be performed in response to detecting that the other autonomous moving body moves along the planned movement path after the other autonomous moving body has overtaken the autonomous moving body.

3. The autonomous moving body according to claim 1, wherein the first determination indicates that overtaking the other autonomous moving body is not to be performed in response to detecting that the other autonomous moving body is not an autonomous moving body of the same type as that of the autonomous moving body.

4. The autonomous moving body according to claim 1, wherein the processor determines, when the other task executed by the other autonomous moving body can be detected from the operation state, whether to overtake the other autonomous moving body based on a comparison between the other task and the task given to the autonomous moving body.

5. The autonomous moving body according to claim 1, wherein the drive circuit controls, in response to the first determination indicating that overtaking the other autonomous moving body is not to be performed, the autonomous moving body to follow the other autonomous moving body while the autonomous moving body shares the planned movement path with the other autonomous moving body.

6. The autonomous moving body according to claim 1, wherein
   the external sensor is configured to recognize an overtaking state for the other autonomous moving body while the drive circuit controls the autonomous moving body so that the autonomous moving body overtakes the other autonomous moving body, and
   the drive circuit is configured to determine whether to continue or abandon overtaking control based on the overtaking state to control the autonomous moving body.

7. The autonomous moving body according to claim 6, wherein the drive circuit is configured to control, when determining to abandon the overtaking control, the autonomous moving body so that the autonomous moving body follows the other autonomous moving body while the autonomous moving body shares the planned movement path with the other autonomous moving body.

8. The autonomous moving body according to claim 1, comprising a presentation unit configured to present, when the autonomous moving body overtakes the other autonomous moving body, to outside that the own the autonomous moving body overtakes the other autonomous moving body, the presentation unit including at least one of a display panel, an LED bar, a speaker, and an oscillator.

9. The autonomous moving body according to claim 1, further comprising a communication device configured to perform intercommunication with the other autonomous moving body, wherein
   the drive circuit is configured to control, while the intercommunication is established, the autonomous moving body based on a communication result of the intercommunication regardless of the first determination.

10. The autonomous moving body according to claim 1, wherein
    the external sensor is configured to detect an obstacle; and
    the drive circuit is configured to
       in response to (i) the first determination indicating that overtaking the other autonomous moving body is to be performed and (ii) the second determination indicating that the overtaking path can be generated, commence the overtaking operation, and
       after commencing the overtaking operation, abandon the overtaking operation in response to detecting the obstacle on the generated overtaking path.

11. The autonomous moving body according to claim 1, wherein
    the drive circuit is configured to abandon the overtaking operation in response to the external sensor detecting that the operation state of the other autonomous moving body includes conveyance of an object laterally protruding from the other autonomous moving body with respect to a moving direction of the other autonomous moving body.

12. A non-transitory computer readable medium storing a control program for an autonomous moving body that moves along a planned movement path to execute a given task, the control program being adapted to cause a computer to perform:

detecting another autonomous moving body given another task and an operation state of the other autonomous moving body by using an external sensor;

performing a first determination of whether to overtake the other autonomous moving body based on the external sensor detecting that the other autonomous moving body is moving along the planned movement path;

performing a second determination of whether an overtaking path can be generated;

in response to (i) the first determination indicating that overtaking the other autonomous moving body is to be performed and (ii) the second determination indicating that the overtaking path can be generated, controlling a autonomous moving body to perform an overtaking operation; and in response to (i) the first determination indicating that overtaking the other autonomous moving body is to be performed and (ii) the second determination indicating that the overtaking path cannot be generated, abandoning of the overtaking operation.

13. The non-transitory computer readable medium of claim 12, wherein the control program is adapted to cause the computer to perform:

detecting an obstacle by using the external sensor;

in response to (i) the first determination indicating that overtaking the other autonomous moving body is to be performed and (ii) the second determination indicating that the overtaking path can be generated, commencing the overtaking operation; and after commencing the overtaking operation, abandoning of the overtaking operation in response to detecting the obstacle on the generated overtaking path.

14. The non-transitory computer readable medium of claim 12, wherein the control program is adapted to cause the computer to perform:

abandoning of the overtaking operation in response to the external sensor detecting that the operation state of the other autonomous moving body includes conveyance of an object laterally protruding from the other autonomous moving body with respect to a moving direction of the other autonomous moving body.

* * * * *